United States Patent
Colletti et al.

(10) Patent No.: US 12,473,090 B2
(45) Date of Patent: Nov. 18, 2025

(54) PARTITION SYSTEMS AND METHODS FOR SEAT ASSEMBLIES

(71) Applicant: THE BOEING COMPANY, Arlington, VA (US)

(72) Inventors: Brian Paul Colletti, Mission Viejo, CA (US); Bailey Bo Betz, Fountain Valley, CA (US)

(73) Assignee: The Boeing Company, Arlington, VA (US)

( * ) Notice: Subject to any disclaimer, the term of this patent is extended or adjusted under 35 U.S.C. 154(b) by 281 days.

(21) Appl. No.: 18/343,121

(22) Filed: Jun. 28, 2023

(65) Prior Publication Data
US 2025/0002156 A1    Jan. 2, 2025

(51) Int. Cl.
*B64D 11/06* (2006.01)
*B60N 2/90* (2018.01)

(52) U.S. Cl.
CPC ............ *B64D 11/0606* (2014.12); *B60N 2/91* (2018.02)

(58) Field of Classification Search
CPC .............................. B60N 2/91; B64D 11/0606
See application file for complete search history.

(56) References Cited

U.S. PATENT DOCUMENTS

| | | | | |
|---|---|---|---|---|
| 6,644,736 B2 * | 11/2003 | Nguyen | ............ | B64D 11/0606 297/184.17 |
| 10,479,506 B1 * | 11/2019 | Colletti | ................... | B60N 2/90 |
| 2023/0312095 A1 * | 10/2023 | Escobar | ............ | B64D 11/0606 244/118.6 |
| 2023/0391441 A1 * | 12/2023 | Dowty | ................... | E05B 65/08 |
| 2023/0415897 A1 * | 12/2023 | Dingankar | ......... | B64D 11/0606 |
| 2024/0150004 A1 * | 5/2024 | LeBlanc | ............... | B64C 1/1438 |
| 2024/0375777 A1 * | 11/2024 | Straub | ................ | B64D 11/0606 |

FOREIGN PATENT DOCUMENTS

| | | | | |
|---|---|---|---|---|
| DE | 202021106853 U1 * | 1/2022 | ............... | B60N 2/91 |
| FR | 3114774 A1 * | 4/2022 | ......... | B64D 11/0606 |
| KR | 19980022534 U * | 7/1998 | ............... | B60N 2/91 |
| KR | 19980050914 U * | 10/1998 | ............... | B60N 2/91 |
| WO | WO-2022119562 A1 * | 6/2022 | ......... | B64D 11/0646 |
| WO | WO-2023227850 A1 * | 11/2023 | ......... | B64D 11/0606 |

* cited by examiner

*Primary Examiner* — Timothy J Brindley
(74) *Attorney, Agent, or Firm* — Joseph M. Butscher; The Small Patent Law Group LLC

(57) ABSTRACT

A seat assembly includes a backrest including a retaining chamber, one or more armrests, and a partition system that includes one or more barrier walls movable between a stowed position and a deployed position. One or more portions of the one or more barrier walls are contained within the retaining chamber when the one or more barrier walls are in the stowed position.

20 Claims, 7 Drawing Sheets

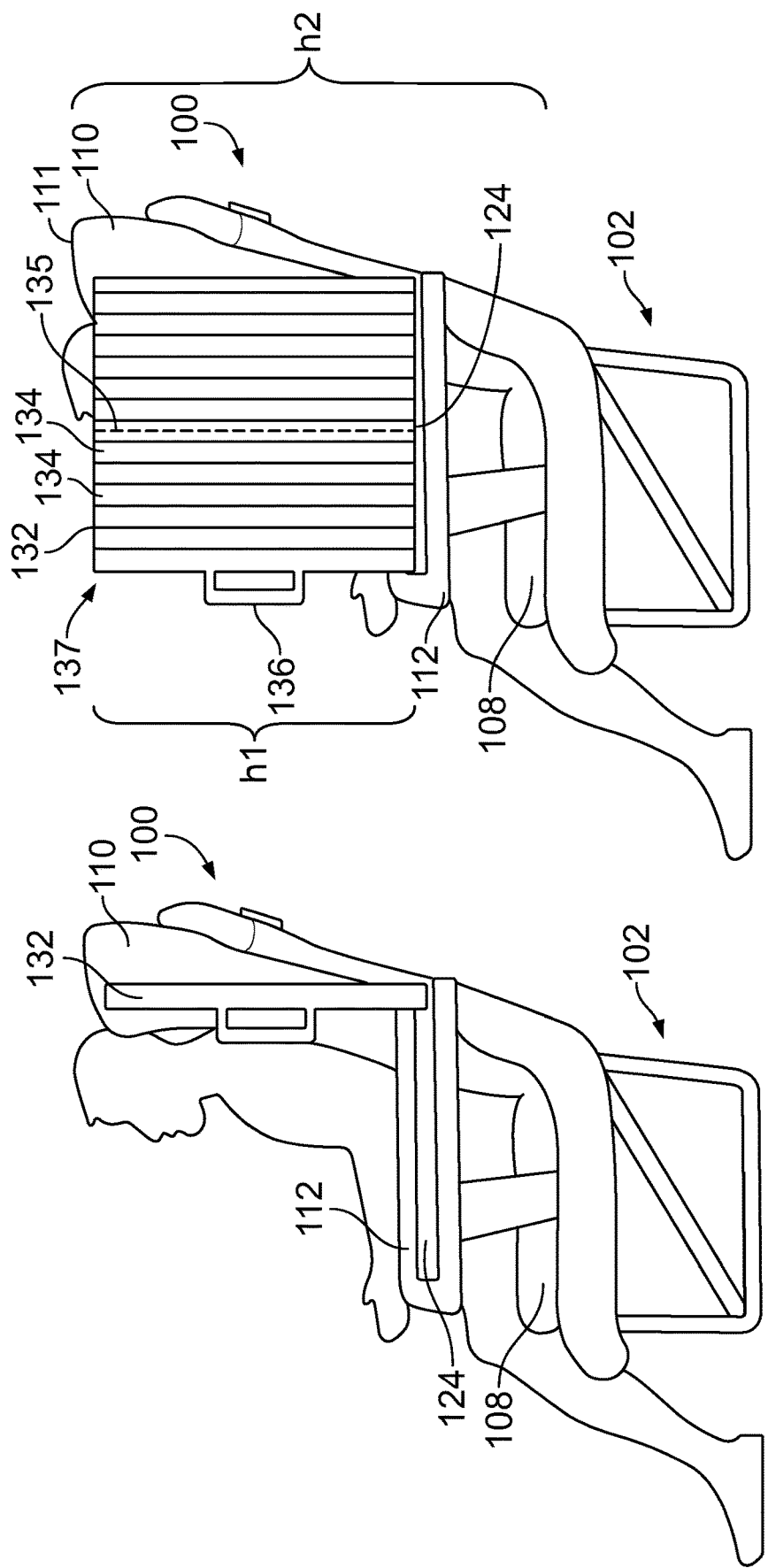

ers. Passengers seated in
PARTITION SYSTEMS AND METHODS FOR SEAT ASSEMBLIES

FIELD OF THE DISCLOSURE

Examples of the present disclosure generally relate to partition systems and methods for seat assemblies, such as can be used within internal cabins of vehicles.

BACKGROUND OF THE DISCLOSURE

Commercial aircraft typically include an internal cabin that may be divided into numerous sections. A flight deck or cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths and/or one or more doors of the aircraft.

Passenger seats are disposed within the internal cabin. In various sections within the internal cabin, adjacent passenger seats may share a common armrest. Passengers seated in adjacent seats may be close to one another. For example, two passengers seated next to one another may find that their respective forearms on the common armrest may directly abut against each other. Further, because the two passengers are seated close to one another, privacy in relation to the two passengers is typically reduced.

SUMMARY OF THE DISCLOSURE

A need exists for a system and a method that provide increased privacy between passengers seated next to one another in an internal cabin of a vehicle, such as a commercial aircraft.

With that need in mind, certain examples of the present disclosure provide a seat assembly including a backrest including a retaining chamber, one or more armrests, and a partition system including one or more barrier walls movable between a stowed position and a deployed position. The one or more portions of the one or more barrier walls are contained within the retaining chamber when the one or more barrier walls are in the stowed position.

The retaining chamber can extend between and through both sides of the backrest.

In at least one example, the one or more armrests include a track configured to receive and moveably retain the one or more portions of the one or more barrier walls during motion between the stowed position and the deployed position.

The one or more barrier walls can include a first barrier wall and a second barrier wall.

The one or more barrier walls can include a handle configured to be grasped by an individual.

In at least one example, the one or more barrier walls include a plurality of flexible segments. At least one of the plurality of flexible segments can include a frangible area. In at least one example, each flexible segment includes a pivot edge at a first end and prongs defining an interior post retainer channel at a second end that is opposite from the first end.

The backrest can also include a guide axle within the retaining chamber. The guide axle is configured to engage the one or more barrier walls. The guide axle can include an outer geared surface that engages the one or more barrier walls.

The seat assembly can also include an actuator operatively coupled to the guide axle. The actuator is configured to operate to automatically move the one or more guide barriers between the stowed position and the deployed position. An activation button can be in communication with the actuator. A control unit can be configured to operate the actuator.

Certain examples of the present disclosure provide a vehicle including an internal cabin, and seat assemblies within the internal cabin, as described herein.

BRIEF DESCRIPTION OF THE DRAWINGS

FIG. 6 illustrates a lateral view of a seat assembly having a partition system with a barrier wall in a stowed position, according to an example of the present disclosure.

FIG. 7 illustrates a lateral view of the seat assembly of FIG. 7 having the barrier wall in the deployed position.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
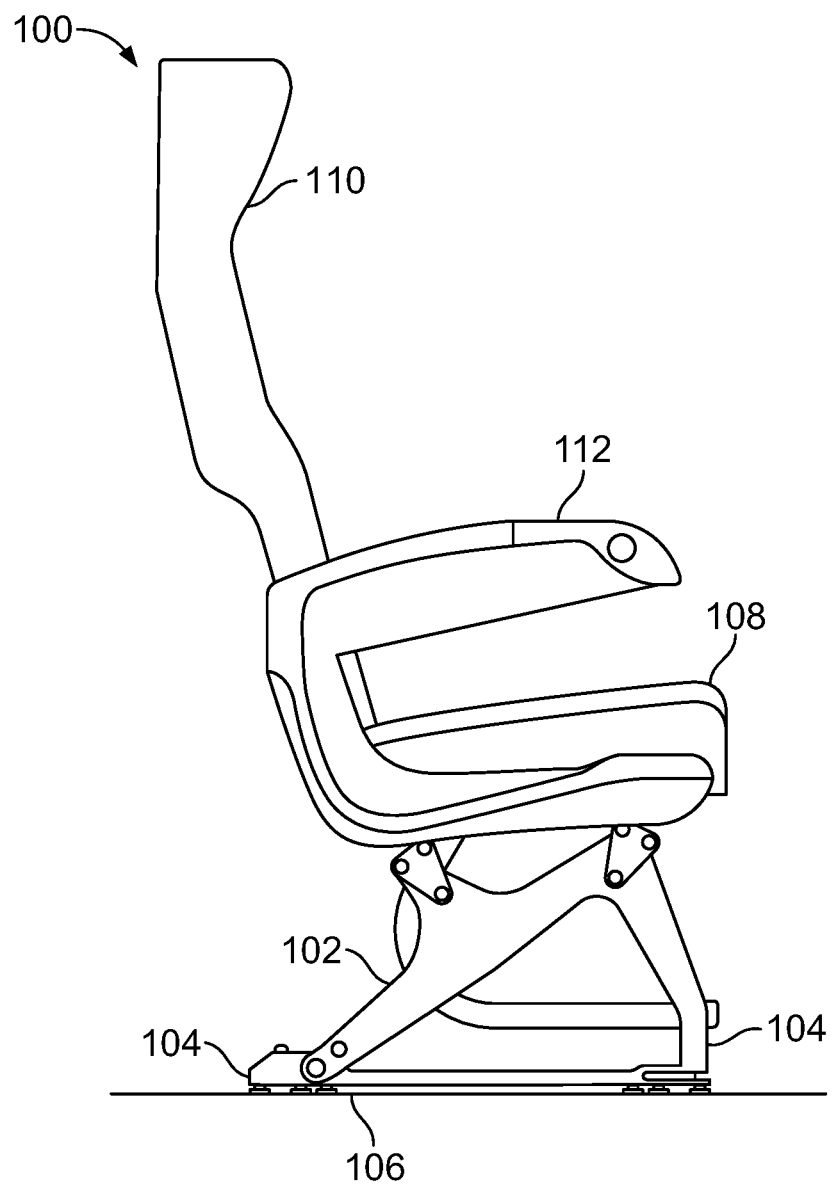
FIG. 1 illustrates a side view of a seat assembly, according to an example of the present disclosure.

FIG. 1 illustrates a side view of a seat assembly 100, according to an example of the present disclosure. The seat assembly 100 may be configured to be secured within an interior cabin of a vehicle, such as a commercial aircraft.

The seat assembly 100 includes a base 102, which may include legs 104 that may be secured to tracks 106 within an interior cabin of a vehicle. The legs 104 may include fittings, fasteners, or the like that are configured to securely connect the legs 104 to the tracks 106. The base 102 supports a seat cushion 108 and a backrest 110. Armrests 112 may be pivotally secured to the backrest 110 and/or the base 102.

As described herein, the seat assembly 100 includes a partition system. The partition system is configured to be selectively moved between a stowed position and a deployed position, in which the partition system provides one or more barrier walls that extend along a length of one or both of the armrests 112.

The seat assembly 100 may include more or fewer components than shown. Further, the seat assembly 100 may have a different shape and size than shown. It is to be understood that the seat assembly 100 shown in FIG. 1 is merely one example of a seat assembly.

Figure 2:
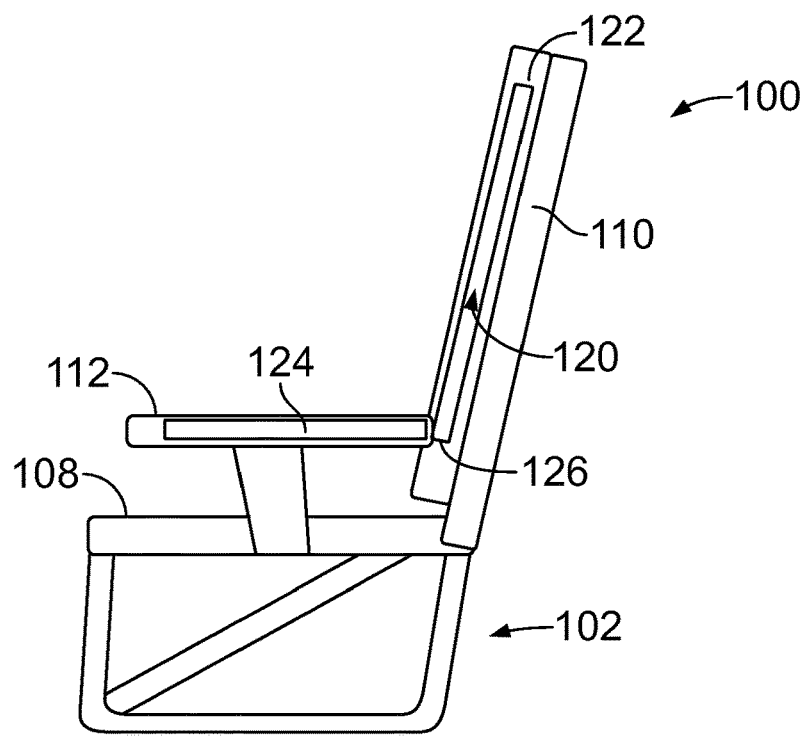
FIG. 2 illustrates a side view of the seat assembly, according to an example of the present disclosure.

FIG. 2 illustrates a side view of the seat assembly 100, according to an example of the present disclosure. The backrest 110 includes a retaining chamber 120 that extends between and through both sides 122 of the backrest 110. In at least one example, the retaining chamber 120 is contained within the backrest 110. That is, the retaining chamber 120 is not a separate and distinct housing mounted to the backrest 110. One or both armrests 112 includes a track 124, such as can be formed on an upper surface of the armrest(s) 112. The track 124 is aligned with the retaining chamber 120. For example, a lower edge of the retaining chamber 126 can be at a common level with the track(s) 124.

Figure 3:
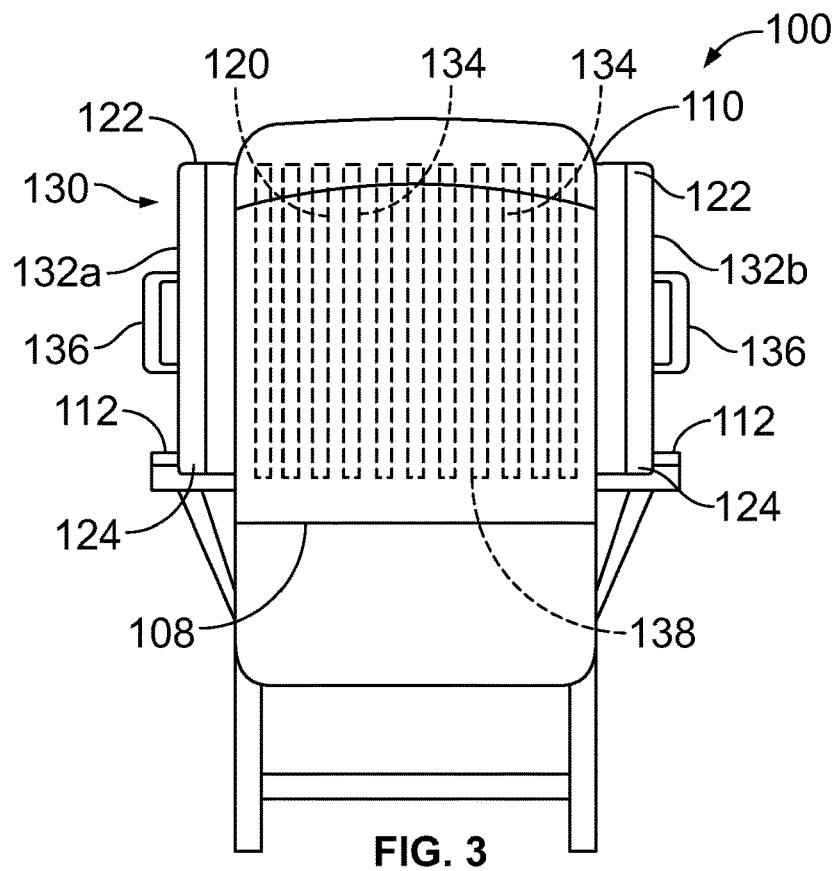
FIG. 3 illustrates a front view of the seat assembly, according to an example of the present disclosure.
Figure 4:
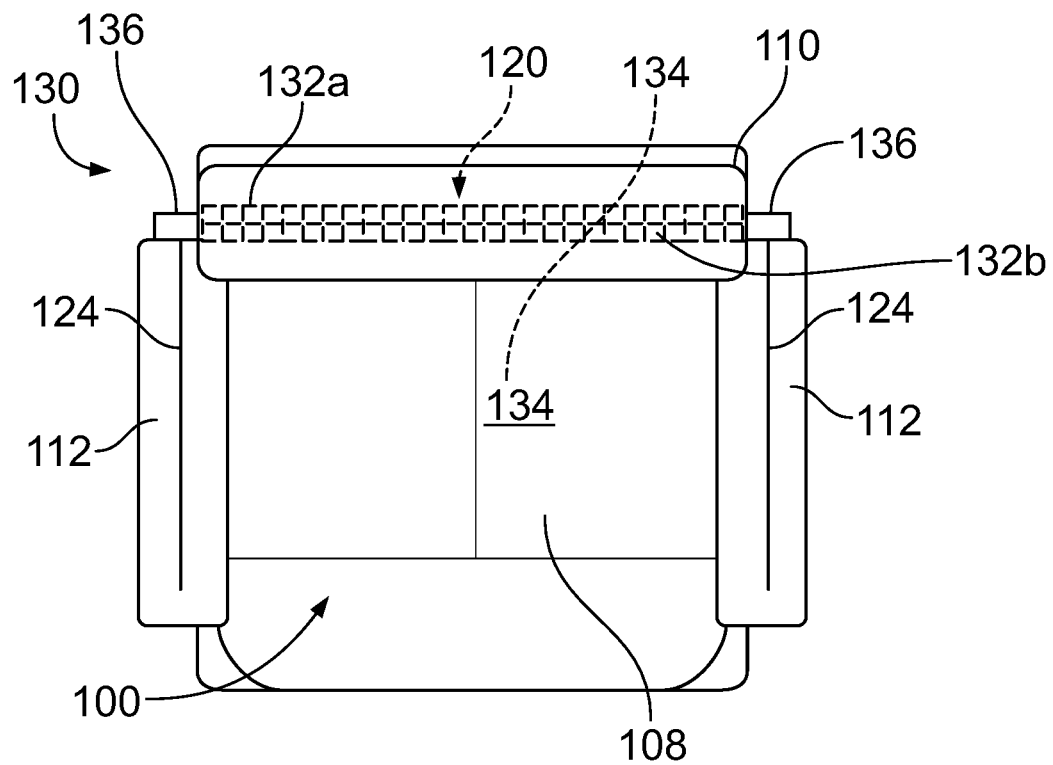
FIG. 4 illustrates a top view of the seat assembly of FIG. 3.

FIG. 3 illustrates a front view of the seat assembly 100, according to an example of the present disclosure. FIG. 4 illustrates a top view of the seat assembly 100 of FIG. 3. Referring to FIGS. 2-4, the seat assembly 100 includes a partition system 130, which includes one or more barrier walls 132. For example, the partition system 130 includes a first barrier wall 132a and a second barrier wall 132a. Optionally, the partition system 130 can include only a single barrier wall.

As shown in FIG. 3, the barrier walls 132a and 132b are in stowed positions. Each barrier wall 132a and 132b includes a plurality of flexible segments 134. In at least one example, a handle 136 extends from a terminal flexible segment 134 of each of the barrier walls 132a and 132b. The handle 136 extends out of the retaining chamber 120 when the barrier walls 132a and 132b are in stowed positions.

In the stowed positions, a majority of each barrier wall 132a and 132b is stowed inside of the backrest 110 within the retaining chamber 120. In particular, the handles 136 coupled to terminal flexible segments 134 extend outwardly from the backrest 110. Lower edges of the barrier walls 132a and 132b can be slidably retained within a track 138 secured within the retaining chamber 120 within the backrest 110. The track 138 can be aligned with the tracks 124 of the armrests 112.

Instead of having separate and distinct housings for the barrier walls 132a and 132b, the backrest 110 includes the retaining chamber 120, which stores the barrier walls 132a and 132b in the stowed positions. In this manner, the partition system 130 is more compact, lighter, and less bulky than partitions that are stowed within separate and distinct housings mounted to a seat assembly.

In at least one example, one or both of the armrests 112 can be a shared armrest with an adjacent seat assembly 100. For example, two seat assemblies can be disposed next to each other, with the seat assemblies sharing a single armrest.

Figure 5:
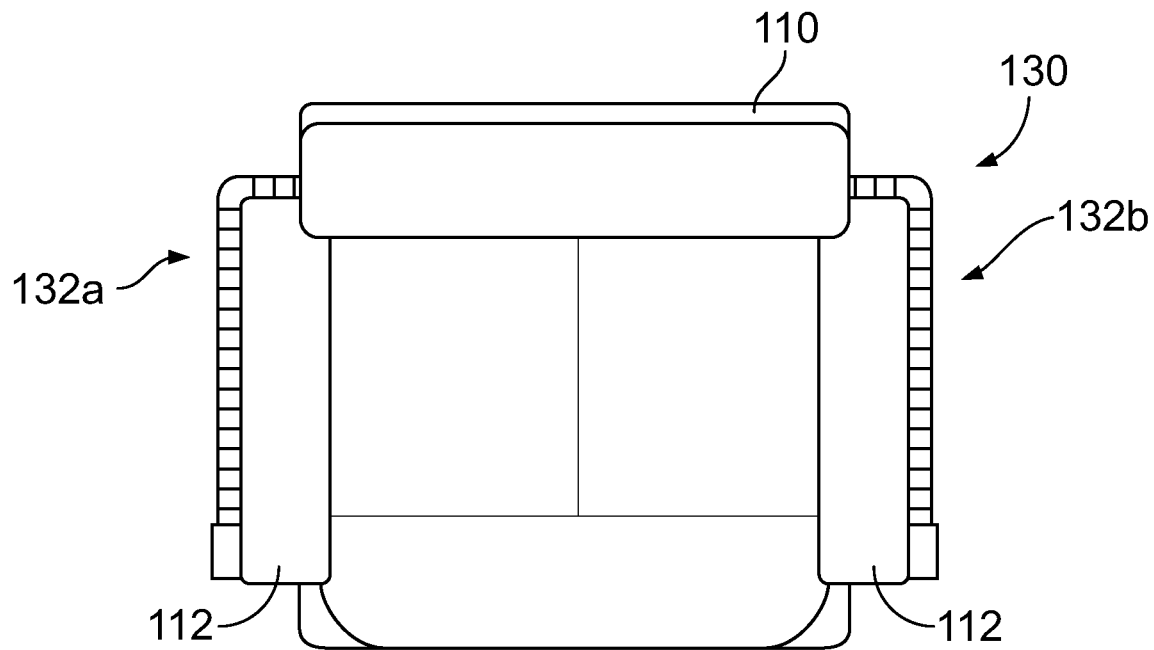
FIG. 5 illustrates a top view of the seat assembly of FIG. 3 having barrier walls in deployed positions, according to an example of the present disclosure.

FIG. 5 illustrates a top view of the seat assembly 100 of FIG. 3 having the barrier walls 132a and 132b in deployed positions, according to an example of the present disclosure. Referring to FIGS. 2-5, in order to move the barrier walls 132a and 132b from the stowed positions (shown n FIGS. 3 and 4) to the deployed positions, an individual may grasp the handles 136 and pull the barrier walls 132a and 132b out of the retaining chamber 120 of the backrest 110. As the barrier walls 132a and 132b are outwardly pulled, the lower edges of the barrier walls 132a and 132b slide through the tracks 124 of the armrests 112. The tracks 124 may extend along entire lengths of the armrests 112, or may optionally extend over less than entire lengths of the armrests 112.

In order to move the barrier walls 132a and 132b back to the stowed positions, an individual may push that barrier walls 132a and 132b inwardly along the tracks 124, thereby moving the barrier walls 132a and 132b back into the retaining chamber 120 of the backrest 110. As described, in at least one example, the barrier walls 132a and 132b can be manually moved between stowed positions and deployed positions. Optionally, the barrier walls 132a and 132b can be automatically moved between stowed positions and deployed positions.

FIG. 6 illustrates a lateral view of the seat assembly 100 having the partition system 130 with the barrier wall 132 in a stowed position, according to an example of the present disclosure. FIG. 7 illustrates a lateral view of the seat assembly 100 of FIG. 7 having the barrier wall 132 in the deployed position. Referring to FIGS. 6 and 7, a height h1 of the barrier wall 132 can substantially extend to a height h2 of the backrest 110. For example, the height h1 can extend to a top level 111 of the backrest 110, or to a level that is within 2"-4" of the top level 111. Optionally, the height h1 can be less than the height h2. For example, the height h1 can be 75% or less than the height h2. As another example, the height h1 can be 50% the height h2.

In at least one example, one or more of the flexible segments 134 can include a frangible area 135. For example, the frangible area 135 can be a weakened line (such as cut or recessed) that extends along a height of a flexible segment 134. The frangible area 135 is configured to break when a predetermined force is exerted therein. For example, if the barrier wall 132 becomes inadvertently locked in position, an individual can grasp a top edge of the barrier wall 132 and inwardly pull inwardly or push outwardly, which exerts force into the frangible area 135 causing the front portion 137 of the barrier wall 132 to break off and out of the track 124. In this manner, the barrier wall 132 can include a breakaway portion that is configured to be removed in case an egress path is needed (such as if the barrier wall 132 jams or otherwise inadvertently locks in place).

As described herein, the seat assembly 100 includes the backrest 110 including the retaining chamber 120 and one or more armrests 112. The partition system 130 includes one or more barrier walls 132 movable between a stowed position and a deployed position. The one or more portions of the one or more barrier walls 132 are contained within the retaining chamber 120 when the one or more barrier walls 132 are in the stowed position.

As noted, the retaining chamber 120 can extend between through both sides of the backrest. The armrest(s) 112 include the tracks 124 configured to receive and moveably retain the portions(s) of the barrier wall(s) 132 during motion between the stowed position and the deployed position.

Figure 8:
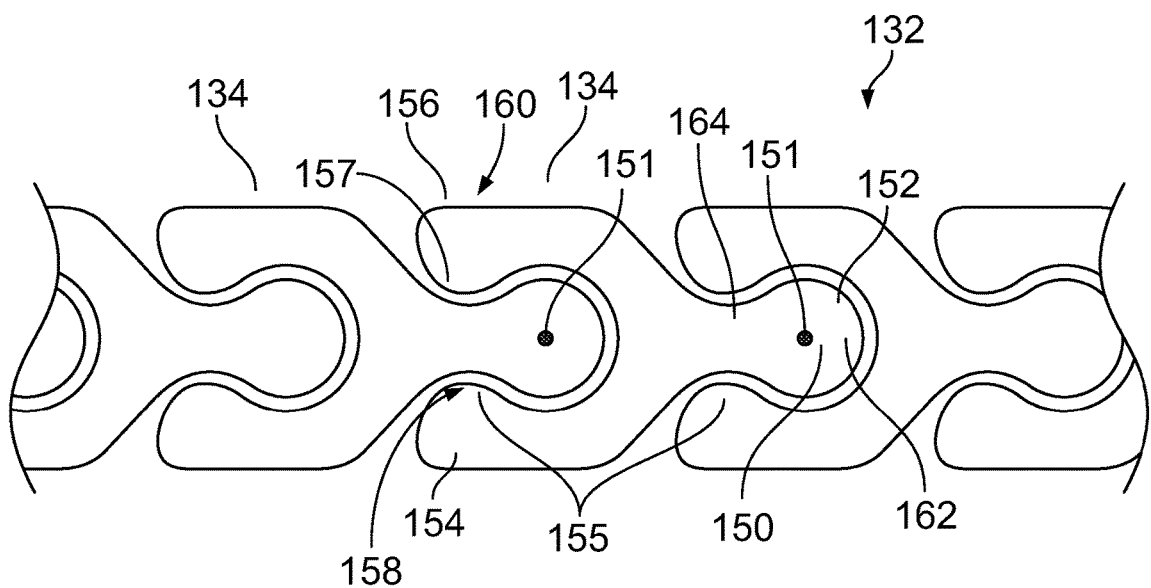
FIG. 8 illustrates a top view of a portion of a barrier wall, according to an example of the present disclosure.

FIG. 8 illustrates a top view of a portion of a barrier wall 132, according to an example of the present disclosure. In at least one example, each flexible segment 134 includes a pivot edge 150 at one end 152 and prongs 154 and 156 defining an interior post retainer channel 158 at an opposite end 160. The pivot edge 150 includes an expanded ridge 162 that connects to a reduced neck 164, which, in turn, connects to the prongs 154 and 156. An expanded ridge 162 fits within a post retainer channel 158 of a neighboring flexible segment 134, with the reduced neck 164 fitting between inwardly directed fingers 155 and 157 of the prongs 154 and 156, respectively. In this manner, the flexible segments 134 are configured to pivot or otherwise rotate about pivot axes 151 of the pivot expanded ridges 162, as the barrier wall 132 is moved between stowed and deployed positions.

FIG. 8 shows one type of barrier wall 132 having flexible segments 134. Optionally, the flexible segments 134 can be sized, shaped, and configured differently than shown in FIG. 8. For example, the flexible segments 134 can be configured to telescope inwardly and outwardly with respect to one another. As another example, the flexible segments can include rollers that are moveably coupled to one another, such as via pivotal bearings. As another example, the barrier wall 132 can include a flexible mesh screen, instead of separate and distinct segments.

Figure 9:
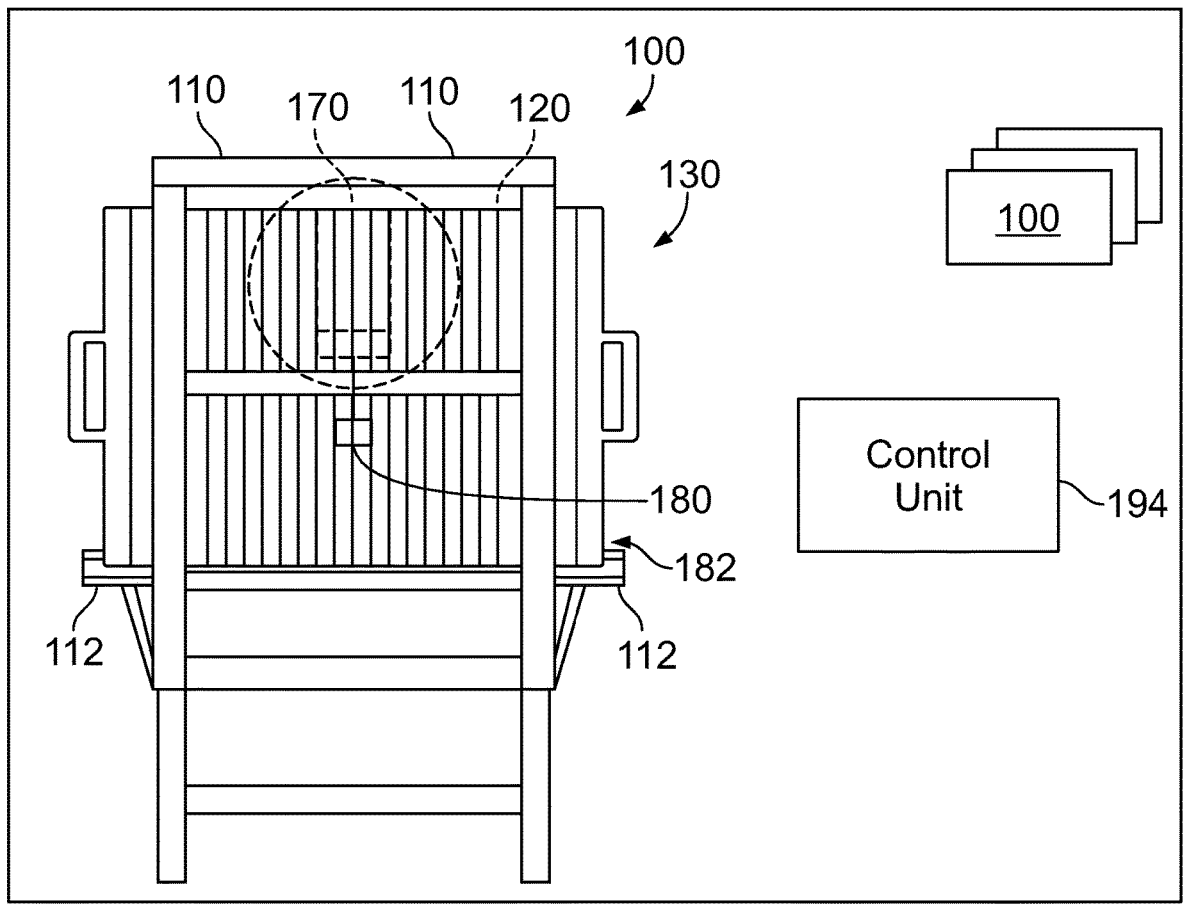
FIG. 9 illustrates a front view of a seat assembly, according to an example of the present disclosure.
Figure 10:
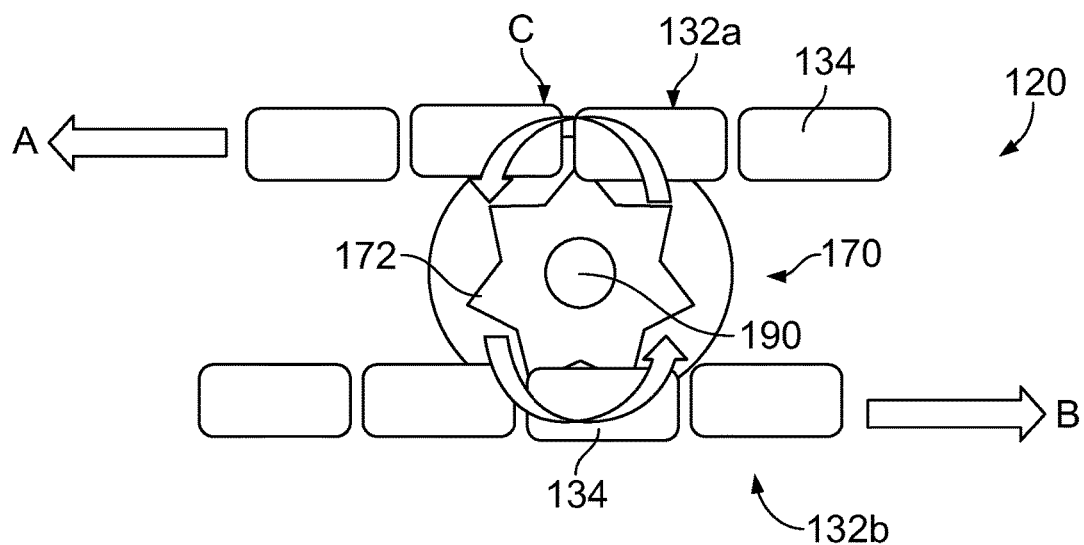
FIG. 10 illustrates a top view of a retaining chamber, according to an example of the present disclosure.

FIG. 9 illustrates a front view of the seat assembly 100, according to an example of the present disclosure. FIG. 10 illustrates a top view of the retaining chamber 120, according to an example of the present disclosure. Referring to FIGS. 9 and 10, in at least one example, a guide axle 170 can be rotatably secured within the retaining chamber 120. The guide axle 170 can include an outer geared surface 172 that is configured to engage the barrier walls 132a and 132b within the retaining chamber 120.

As the barrier walls 132a and 132b are moved outwardly in the directions of arrows A and B, respectively, toward the deployed positions, the guide axle 170 rotates in in the direction of arc C in response thereto, with the geared surface 172 engaging the flexible segments 134. The motion is reversed in relation to movement toward the stowed positions. In this manner, the guide axle 170 controls motion of the barrier walls 132a and 132, thereby providing smooth and controlled movement between the stowed and deployed positions.

In at least one example, an actuator 180 can be operatively coupled to the guide axle 170. The actuator 180 can be an electric and/or rotary motor, for example. The actuator 180 can be in communication with an activation button 182, such as can be disposed on an armrest 112. For example, the activation button 182 can be in communication with the actuator 180 through one or more wired or wireless connections.

In operation, the activation button 182 can be pressed to automatically move the barrier walls 132a and/or 132b between stowed and deployed positions. In response to the activation button 182 being pressed, the actuator 180 operates to rotate the guide axle 170 about a central axis 190. As the guide axle 170 rotates, the geared surface 172 engages the flexible segments 134, thereby automatically moving the barrier walls 132 and/or 132b between stowed and deployed positions.

In at least one example, a control unit 194 is in communication with the actuator 180 (such as through one or more wired or wireless connections) of the seat assembly 100 and other seat assemblies 100 within an internal cabin. The control unit 194 can be a master operational control unit that is configured to override the activation button 182. For example, the control unit 194 can be configured to automatically operate the actuators 180 of the seat assemblies 100 during various phases of travel. As an example, a flight attendant may operate a user interface that allows that control unit 194 to automatically operate the actuators 180 to ensure that the barrier walls 132 are all in stowed positions during takeoff and landing of an aircraft.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 194 may be or include one or more processors that are configured to control operation, as described herein.

The control unit 194 is configured to execute a set of instructions that are stored in one or more data storage units or elements (such as one or more memories), in order to process data. For example, the control unit 194 may include or be coupled to one or more memories. The data storage units may also store data or other information as desired or needed. The data storage units may be in the form of an information source or a physical memory element within a processing machine.

The set of instructions may include various commands that instruct the control unit 194 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 194. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 194 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory. ROM memory, EPROM memory, EEPROM memory, and non-volatile RAM (NVRAM) memory. The above data storage unit types are exemplary only, and are thus not limiting as to the types of memory usable for storage of a computer program.

Optionally, a control unit may not be used to automatically operate the actuators 180. Also, optionally, the partition system 130 may not be configured for automatic operation. For example, the partition system 130 may not include the actuator 180 and the activation button 182. Also, optionally, the partition system 130 may not include the guide axle 170.

Referring to FIGS. 1-10, examples of the present disclosure provide a seat assembly 100 including a partition system 130 having one or more barrier walls 132 moveable between a stowed position and a deployed position. In the stowed position, the barrier wall(s) 132 include at least a portion that is retained within the backrest 110.

Figure 11:
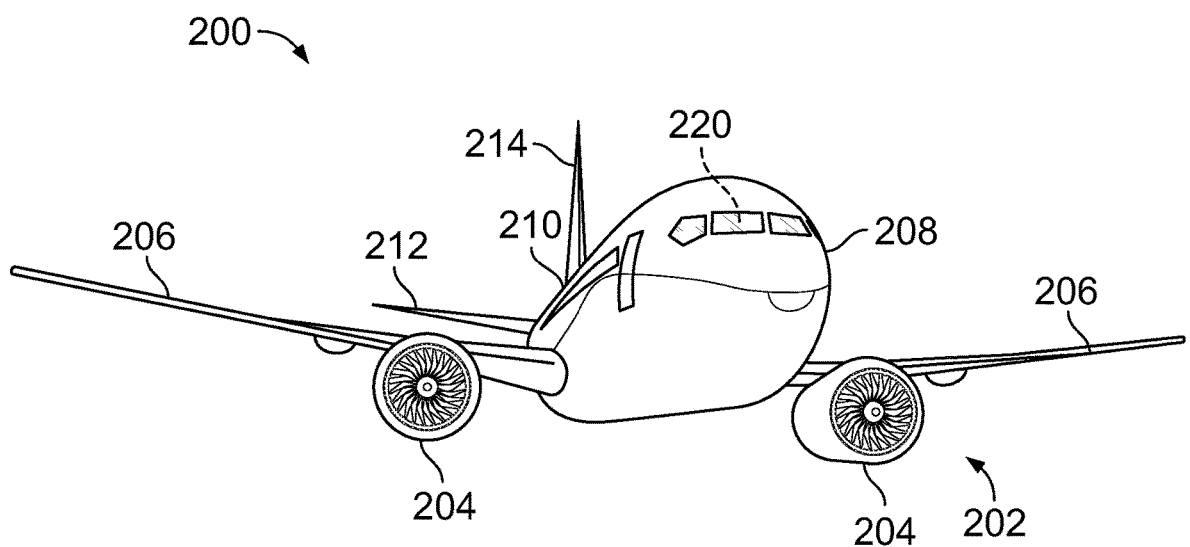
FIG. 11 illustrates a perspective front view of an aircraft, according to an example of the present disclosure.

FIG. 11 illustrates a perspective front view of an aircraft 200, according to an example of the present disclosure. The aircraft 200 includes a propulsion system 202 that includes engines 204, for example. Optionally, the propulsion system 202 may include more engines 204 than shown. The engines 204 are carried by wings 206 of the aircraft 200. In other examples, the engines 204 may be carried by a fuselage 208 and/or an empennage 210. The empennage 210 may also support horizontal stabilizers 212 and a vertical stabilizer 214. The fuselage 208 of the aircraft 200 defines an internal cabin 220, which includes a flight deck or cockpit, one or more work sections (for example, galleys, personnel carry-on baggage areas, and the like), one or more passenger sections (for example, first class, business class, and coach sections), one or more lavatories, and/or the like. FIG. 11 shows an example of an aircraft 200. It is to be understood that the aircraft 200 can be sized, shaped, and configured differently than shown in FIG. 11.

Referring to FIGS. 1-11, the internal cabin 220 of the aircraft 200 includes one or more seat assemblies 100 having a partition system 130, as described herein. As another example, the seat assemblies 100 can be used within internal cabins of various other vehicles, such as buses, trains, watercraft, spacecraft, and the like. As another example, the seat assemblies 100 can be used within fixed structures, such as commercial or residential buildings. As an example, the seat assemblies 100 can be used within lecture halls and/or testing facilities at academic or licensing institutions. As another example, the seat assemblies 100 can be used in polling locations during elections.

Figure 12:
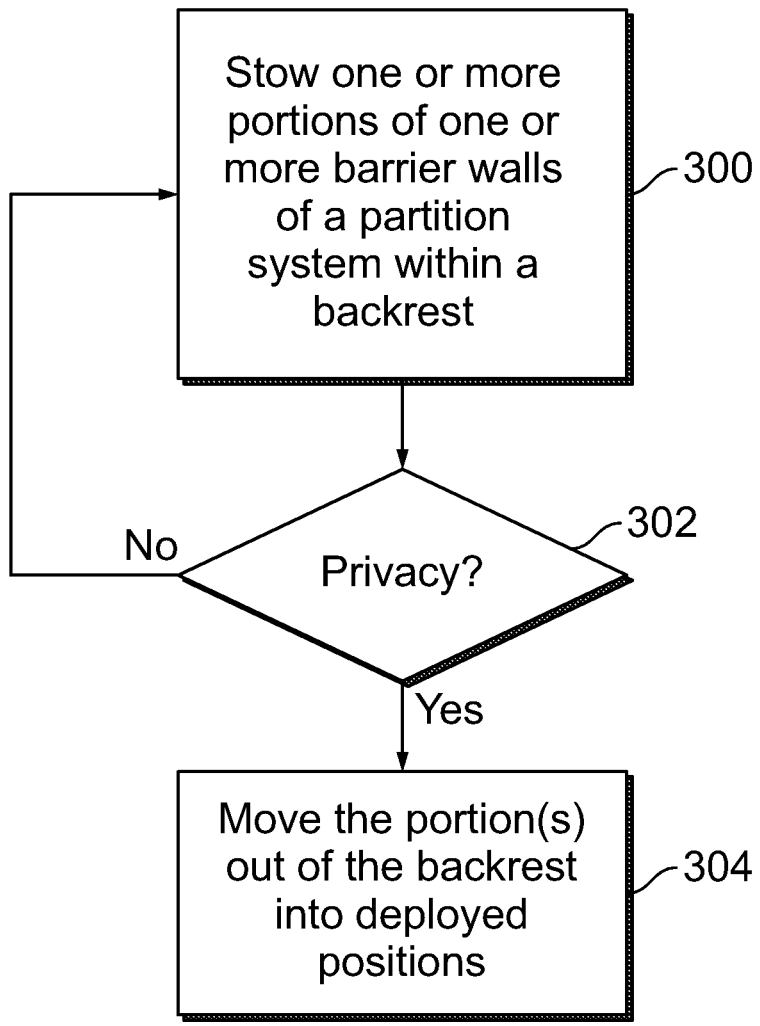
FIG. 12 illustrates a flow chart of a method, according to an example of the present disclosure.

FIG. 12 illustrates a flow chart of a method, according to an example of the present disclosure. Referring to FIGS. 1-12, at 300, one or more portions of one or more barrier walls 132 of the partition system 130 are stowed within a backrest 110 of a seat assembly 100. At 302, it is determined if privacy is desired. If not, the method returns to 300, at which the portion(s) remain in the stowed position. If, however, privacy is desired at 304, the portion(s) are moved out of the backrest 110 into the deployed positions.

Further, the disclosure comprises examples according to the following clauses:

Clause 1. A seat assembly, comprising:
a backrest including a retaining chamber;
one or more armrests; and
a partition system including one or more barrier walls movable between a stowed position and a deployed position, wherein one or more portions of the one or more barrier walls are contained within the retaining chamber when the one or more barrier walls are in the stowed position.

Clause 2. The seat assembly of Clause 1, wherein the retaining chamber extends between and through both sides of the backrest.

Clause 3. The seat assembly of Clauses 1 or 2, wherein the one or more armrests include a track configured to receive and moveably retain the one or more portions of the one or more barrier walls during motion between the stowed position and the deployed position.

Clause 4. The seat assembly of any of Clauses 1-3, wherein the one or more barrier walls comprise a first barrier wall and a second barrier wall.

Clause 5. The seat assembly of any of Clauses 1-4, wherein the one or more barrier walls comprise a handle configured to be grasped by an individual.

Clause 6. The seat assembly of any of Clauses 1-5, wherein the one or more barrier walls comprise a plurality of flexible segments.

Clause 7. The seat assembly of Clause 6, wherein at least one of the plurality of flexible segments comprises a frangible area.

Clause 8. The seat assembly of Clauses 6 or 7, wherein each flexible segment comprises a pivot edge at a first end and prongs defining an interior post retainer channel at a second end that is opposite from the first end.

Clause 9. The seat assembly of any of Clauses 1-8, wherein the backrest further comprises a guide axle within the retaining chamber, wherein the guide axle is configured to engage the one or more barrier walls.

Clause 10. The seat assembly of Clause 9, wherein the guide axle comprises an outer geared surface that engages the one or more barrier walls.

Clause 11. The seat assembly of Clauses 9 or 10, further comprising an actuator operatively coupled to the guide axle, wherein the actuator is configured to operate to automatically move the one or more guide barriers between the stowed position and the deployed position.

Clause 12. The seat assembly of Clause 11, further comprising an activation button in communication with the actuator.

Clause 13. The seat assembly of Clauses 11 or 12, wherein a control unit is configured to operate the actuator.

Clause 14. A vehicle comprising:
an internal cabin; and
seat assemblies within the internal cabin, wherein the seat assemblies comprise:
a backrest including a retaining chamber;
one or more armrests; and
a partition system including one or more barrier walls movable between a stowed position and a deployed position, wherein one or more portions of the one or more barrier walls are contained within the retaining chamber when the one or more barrier walls are in the stowed position.

Clause 15. The vehicle of Clause 14, wherein the retaining chamber extends between and through both sides of the backrest, wherein the one or more armrests include a track configured to receive and moveably retain the one or more portions of the one or more barrier walls during motion between the stowed position and the deployed position, and wherein the one or more barrier walls comprise a handle configured to be grasped by an individual.

Clause 16. The vehicle of Clauses 14 or 15, wherein the one or more barrier walls comprise a plurality of flexible segments.

Clause 17. The vehicle of Clause 16, wherein at least one of the plurality of flexible segments comprises a frangible area.

Clause 18. The vehicle of any of Clauses 14-17, wherein the backrest further comprises a guide axle within the retaining chamber, wherein the guide axle is configured to engage the one or more barrier walls, and wherein the guide axle comprises an outer geared surface that engages the one or more barrier walls.

Clause 19. The vehicle of clause 18, wherein the seat assemblies further comprise:
- an actuator operatively coupled to the guide axle, wherein the actuator is configured to operate to automatically move the one or more guide barriers between the stowed position and the deployed position; and
- an activation button in communication with the actuator.

Clause 20. The vehicle of Clause 19, further comprising a control unit configured to operate the actuator.

As described herein, examples of the present disclosure provide systems and methods that provide increased privacy between passengers seated next to one another in an internal cabin of a vehicle, such as a commercial aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A seat assembly, comprising:
   - a backrest including a retaining chamber extending between and through both sides of the backrest;
   - one or more armrests; and
   - a partition system including one or more barrier walls movable between a stowed position and a deployed position, wherein one or more portions of the one or more barrier walls are contained within the retaining chamber when the one or more barrier walls are in the stowed position.

2. The seat assembly of claim 1, wherein the one or more armrests include a track configured to receive and moveably retain the one or more portions of the one or more barrier walls during motion between the stowed position and the deployed position.

3. The seat assembly of claim 1, wherein the one or more barrier walls comprise a first barrier wall and a second barrier wall.

4. The seat assembly of claim 1, wherein the one or more barrier walls comprise a handle configured to be grasped by an individual.

5. The seat assembly of claim 1, wherein the one or more barrier walls comprise a plurality of flexible segments.

6. The seat assembly of claim 5, wherein at least one of the plurality of flexible segments comprises a frangible area.

7. The seat assembly of claim 5, wherein each flexible segment comprises a pivot edge at a first end and prongs defining an interior post retainer channel at a second end that is opposite from the first end.

8. The seat assembly of claim 1, wherein the backrest further comprises a guide axle within the retaining chamber, wherein the guide axle is configured to engage the one or more barrier walls.

9. The seat assembly of claim 8, wherein the guide axle comprises an outer geared surface that engages the one or more barrier walls.

10. The seat assembly of claim 8, further comprising an actuator operatively coupled to the guide axle, wherein the actuator is configured to operate to automatically move the one or more guide barriers between the stowed position and the deployed position.

11. A seat assembly, comprising:
    - a backrest including a retaining chamber and a guide axle within the retaining chamber;
    - one or more armrests;
    - a partition system including one or more barrier walls movable between a stowed position and a deployed position, wherein one or more portions of the one or more barrier walls are contained within the retaining chamber when the one or more barrier walls are in the stowed position, and wherein the guide axle is configured to engage the one or more barrier walls; and
    - an actuator operatively coupled to the guide axle, wherein the actuator is configured to operate to automatically move the one or more guide barriers between the stowed position and the deployed position.

12. The seat assembly of claim 11, wherein a control unit is configured to operate the actuator.

13. A vehicle comprising:
    - an internal cabin; and
    - seat assemblies within the internal cabin, wherein the seat assemblies comprise:
      - a backrest including a retaining chamber extending between and through both sides of the backrest;

one or more armrests; and a partition system including one or more barrier walls movable between a stowed position and a deployed position, wherein one or more portions of the one or more barrier walls are contained within the retaining chamber when the one or more barrier walls are in the stowed position.

14. The vehicle of claim 13, wherein the one or more armrests include a track configured to receive and moveably retain the one or more portions of the one or more barrier walls during motion between the stowed position and the deployed position, and wherein the one or more barrier walls comprise a handle configured to be grasped by an individual.

15. The vehicle of claim 13, wherein the one or more barrier walls comprise a plurality of flexible segments.

16. The vehicle of claim 15, wherein at least one of the plurality of flexible segments comprises a frangible area.

17. The vehicle of claim 13, wherein the backrest further comprises a guide axle within the retaining chamber, wherein the guide axle is configured to engage the one or more barrier walls, and wherein the guide axle comprises an outer geared surface that engages the one or more barrier walls.

18. The vehicle of claim 17, wherein the seat assemblies further comprise:

an actuator operatively coupled to the guide axle, wherein the actuator is configured to operate to automatically move the one or more guide barriers between the stowed position and the deployed position; and an activation button in communication with the actuator.

19. The vehicle of claim 18, further comprising a control unit configured to operate the actuator.

20. The seat assembly of claim 11, further comprising an activation button in communication with the actuator.

* * * * *